United States Patent [19]

Lussenden

[11] 4,043,051

[45] Aug. 23, 1977

[54] METHOD AND APPARATUS FOR DRYING GRAIN

[76] Inventor: Delbert Lussenden, 2307 Gideon Ave., Zion, Ill. 60099

[21] Appl. No.: 552,360

[22] Filed: Feb. 24, 1975

[51] Int. Cl.² .............................................. F26B 21/08
[52] U.S. Cl. ............................................ 34/77; 34/82; 34/229
[58] Field of Search ................... 62/90, 428, 238, 180, 62/298; 34/77, 78, 82, 172, 173, 222, 223, 224, 225, 232, 233, 48, 50, 229

[56] References Cited

U.S. PATENT DOCUMENTS

| | | | |
|---|---|---|---|
| 1,119,011 | 12/1914 | Grosvenor | 62/238 |
| 1,529,808 | 3/1925 | Pike et al. | 34/241 |
| 1,711,574 | 5/1929 | Miller | 34/46 |
| 2,172,603 | 9/1939 | Adams et al. | 34/82 |
| 2,239,246 | 4/1941 | Pike et al. | 34/173 |
| 2,479,526 | 8/1949 | Touton | 34/225 |
| 2,799,947 | 7/1957 | Elwess | 34/77 |
| 3,672,068 | 6/1972 | Wilkison | 62/238 |
| 3,872,686 | 3/1975 | Patrie | 62/298 |

Primary Examiner—John J. Camby
Assistant Examiner—Larry I. Schwartz
Attorney, Agent, or Firm—Olson, Trexler, Wolters, Bushnell & Fosse, Ltd.

[57] ABSTRACT

The embodiment of the invention disclosed herein is directed to a method and apparatus for drying grain. A refrigerating system is mounted within the closed-loop air duct structure which extends from an outlet to an inlet of a grain storage bin. The evaporator of the refrigerating system dries warm moisture-laden air as it passes through the closed-loop air duct. The air is then preheated by the compressor of the refrigeration system and finally heated by the condensor thereof. This heated air is then returned to the grain storage bin where it flows through a distributor for uniformly drying grain. An air flow bypass is provided at the inlet of the evaporator to take in outside air and vent off the warm moisture-laden air to atmosphere should the evaporator temperature increase beyond a predetermined point.

13 Claims, 2 Drawing Figures

METHOD AND APPARATUS FOR DRYING GRAIN

BACKGROUND OF THE INVENTION

This invention relates generally to a method and apparatus for drying grain in storage, and more particularly, to a new and improved method and apparatus.

Over the years, it has become well-established that grain tends to spoil in storage, particularly when the moisture content of the grain is fairly high. For example, it has been found that the higher the moisture content within corn at harvest time, the more cracks and fines the corn will develop during the handling and drying. Furthermore, foreign material in turn makes it more difficult to keep the corn from deteriorating while in storage. At present, the losses of grain in storage, particularly corn, are minimized by taking certain precautions in handling of such grain.

It has been found that drying grain such as corn to below a 15% moisture content substantially minimizes the losses of the corn due to mold, bacteria, or other micro-organisms. In some instances, for example soft corn, it is desirable to dry the grain to approximately 13½% moisture content. Furthermore, it is important that the moisture content throughout the grain storage bin be uniform. If not, molds can grow where there are pockets of moist grain. This is a prevalent problem since some mold spores develop in the field and are carried in to the grain storage bin.

Proper drying will arrest mold growth in the grain storage bin. For example, if the relative humidity of the grain is kept below 65%, molds develop very slowly, if at all. However, at a relative humidity of about 75%, mold growth is rather rapid and abundant. Furthermore, when mold develops, such as in a pocket located within the grain storage bin, a temperature of about 130° F. can be reached. This high temperature can be noticed and detected by inserting a thermometer probe into the grain bed and taking a temperature reading. Another approach to detecting the elevation in temperature is to sense the temperature of the air coming out of the aeration fan at the top of the grain storage bin. This temperature should be about 100° F. when everything is normal. As heat builds up within the storage bin, the sound kernels of corn will break down and become dark in color.

To overcome these problems, grain storage bins have been provided with means for drying the grain while it is in storage in grain elevators, and the like. However, such prior art grain drying apparatus and methods are rather complex and expensive. Generally, they require elaborate independent means for heating and drying the grain.

SUMMARY OF THE INVENTION

Accordingly, it is an object of this invention to provide a new and improved method and apparatus of grain storage which overcomes the problems of the prior art.

Another object of this invention is to provide a new and improved method and apparatus for storing grain which substantially reduces the cost of drying the grain while in storage.

Still another object of this invention is to provide a new and improved method of storing grain which eliminates the need of drying the grain prior to placing it in a grain storage bin, thereby eliminating the additional handling of the grain which usually results in higher cost and substantial losses.

Still another object of this invention is to provide a grain storage bin and dryer means which is formed integral therewith for efficiently and automatically sensing the condition of the grain stored therein and controlling aeration and drying operations.

Still another object of this invention is to provide a grain storage apparatus which continuously monitors the condition of the grain and automatically effects operation of grain conditioning equipment to maintain the grain in good condition at all times.

Still another object of this invention is to provide new and improved grain storage bins which dry the grain uniformly throughout the entire volume of the grain thereby eliminating bacteria and micro-organisms from growing in pockets.

Still another object of this invention is to provide a method and apparatus for drying grain at a relatively low temperature thereby allowing anti-bacterial chemicals to be injected into the airstream flowing through the grain storage bin for killing various molds and growths.

Briefly, a grain storage bin is provided with an air distributor structure is mounted therein for providing a multitude of air jets through the entire volume of grain for drying purposes. A closed-loop duct is constructed from an outlet at the top wall of the grain storage bin and provides an air flow path from this outlet to an inlet at or near the bottom wall of the grain storage bin. An air conditioning unit is interposed in the closed-loop duct and has the evaporator unit thereof located on the upstream side of the air flow path, this being located nearest the outlet at the top of the grain storage bin. Downstream of the evaporator is located the compressor, and downstream from the compressor is the condensor of the air conditioning unit.

The air conditioning unit will take moisture-laden air from the upper dome portion of the grain storage bin and deliver it to a filter unit, such as an electronic filter or the like. At this filter point, dirt-laden air coming from the grain storage bin will first enter a pre-filter screen where large airborn particles such as chaff are removed. Smaller particles, such as pollen, will pass into the ionizing section of the filter and be removed. The moisture-laden filtered air is then drawn through the evaporator coil of the air conditioning unit and the moisture is condensed and removed at this point. Refrigerated air will then pass over the compressor within the duct work and pick up heat therefrom. The air is preheated by the compressor and further heated by the condensor section of the air conditioning unit. This dry heated air is then delivered to the inlet side at the bottom of the grain storage bin where it is distributed through the grain as small air jets.

Auxiliary heating means may be provided at or near the inlet side of the grain storage bin to augment the heat produced by the condensor of the air conditioning system. Furthermore, a moisture-sensor may be mounted at the outlet of the grain storage bin, as well as temperature-sensing probes inserted into the grain storage bin, for sensing various conditions of the grain for automatically energizing a control circuit to maintain the grain in good condition.

While the grain storage bin and drying apparatus of this invention has particular utility when used in conjunction with corn storage, it will be understood that any grain which requires drying while in storage can be handled by the method and apparatus of this invention.

Many other objects, features and advantages of this invention will be more fully realized and understood from the following detailed description when taken in conjunction with the accompanying drawings wherein like reference numerals throughout the various views of the drawings are intended to designate similar elements or components.

DETAILED DESCRIPTION OF THE ILLUSTRATED EMBODIMENT

Figure 1:
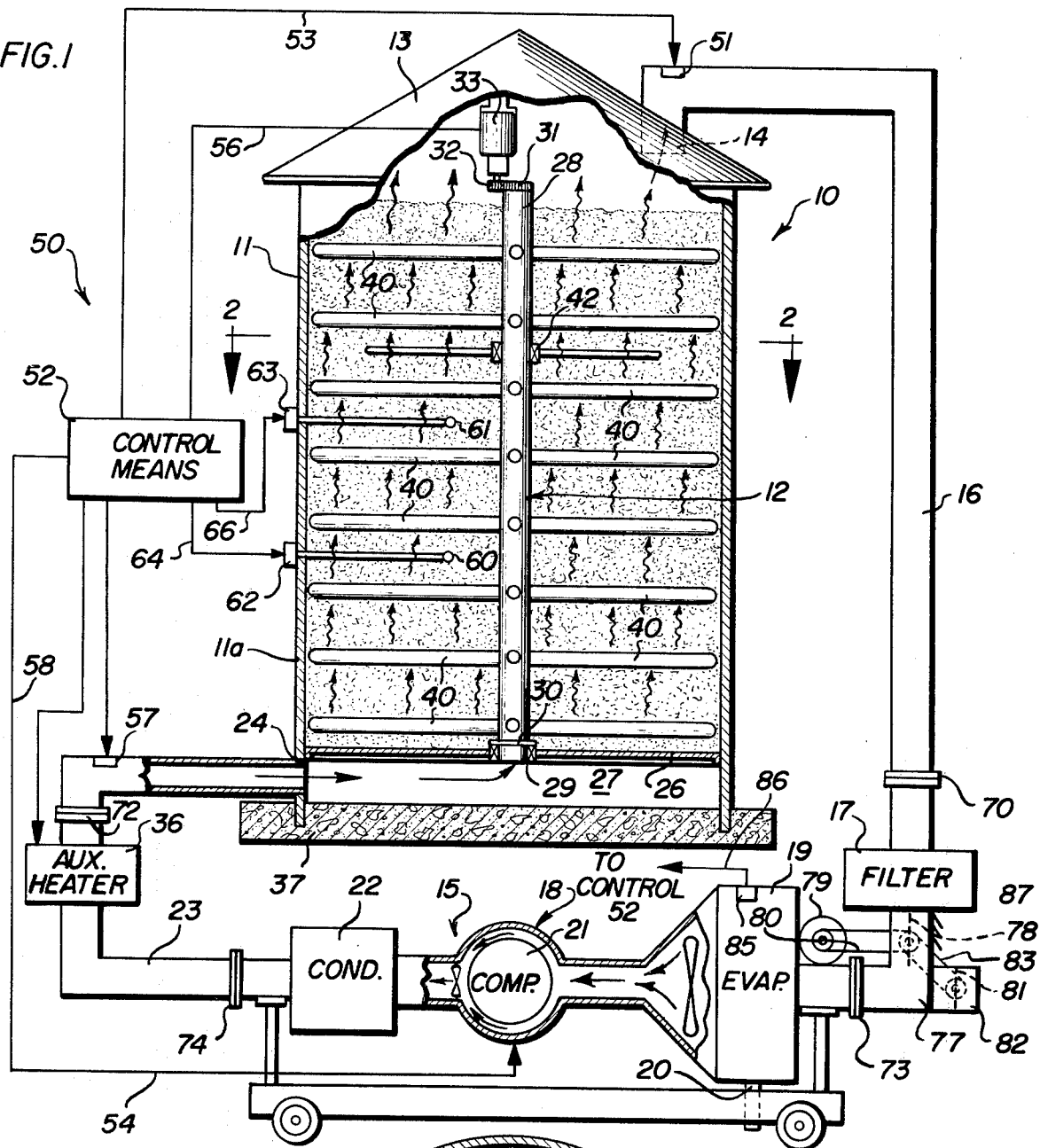
FIG. 1 illustrates an elevational sectional view of a grain storage bin and a drying apparatus constructed in accordance with the principles of this invention.

Referring now to FIG. 1, there is seen grain storage and drying apparatus designated generally by reference numeral 10. The apparatus 10 includes a grain storage bin 11 which is provided with an air distribution manifold structure 12 for distributing drying air throughout a volume of grain stored therein. In the illustrated embodiment, the drying air is distributed in the form of a multitude of small air jets. The distribution manifold 12 may be rotated during the drying operation, as will be described in greater detail hereinbelow.

A top wall 13 of the grain storage bin 11 is provided with an outlet 14 which, in turn, is in fluid communication with a duct 16. The duct 16 provides an enclosed air flow path through a part of the drying apparatus. Air within the duct 16 is filtered by a filter 17 and then delivered to a second duct structure designated generally by reference numeral 18. This second duct structure includes the components of a refrigeration or air condition system 15. For example, an evaporator section 19 receives the moisture-laden air from the duct 16 and condenses the moisture as the air passes therethrough. This moisture may be removed from the evaporator by suitable drain means 20 as illustrated. However, the moisture may be removed by other means if desired. The dried air is then drawn through the duct 18 and over a compressor unit 21. This action preheats the air. The air is then delivered through a condensor unit 22 of the air conditioning system 15 where the air is heated to a higher temperature. The heated dry air is then delivered through a second duct 23 to an inlet 24 at a bottom wall 26 of the grain storage bin 11. Therefore, the grain storage and drying structure of this invention provides a simple and efficient closed-loop drying system which removes moisture-laden air from the top of the storage bin, dries the air, preheats it, heats it again, and delivers the air back to the inlet of the grain storage bin for drying grain therein.

In the illustrated embodiment, the bottom wall 26 of the grain storage bin provides a plenum chamber 27 which is in fluid communication with a hollow shaft or column 28 which forms part of the distributor apparatus 12. The hollow column or shaft 28 is rotatably secured to the bottom wall 26 by bearing means 29 and is provided with suitable seals 30. The upper end of the hollow column 28 is closed and provided with a gear 31 which, in turn, is coupled to an output shaft gear 32 driven by a drive motor 33. It will be understood that other means may be provided for rotating the distributor 12.

An auxiliary heating unit 36 may be provided in the duct 23 to elevate the temperature of the dried air if necessary. This auxiliary heating unit 36 may take the form of either a gas heater or an electric heater, as desired. Furthermore, the general configuration of the central duct 18 which houses the air conditioning and/or refrigerating system 15 can take any form, and preferably is fashioned to accommodate the particular components being used. Also, while the grain storage bin 11 is illustrated as being secured to a concrete foundation 37, it will be understood that the entire system can be portable and mounted on a truckbed, or the like.

Figure 2:
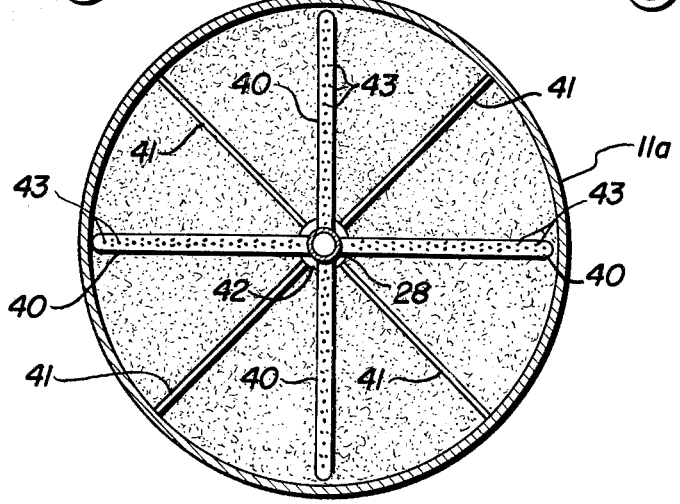
FIG. 2 is a sectional view taken along line 2—2 of FIG. 1 illustrating the air distributor means mounted within the grain storage bin.

FIG. 2 illustrates in more detail the configuration of the distributor 12. Here it can be seen that the hollow column 28 has a plurality of radially outwardly directed hollow arms 40 secured thereto. The arms 40 preferably are located in quadrature groups and each of the groups vertically spaced apart as seen in FIG. 1. To help support the hollow column 28, stays 41 have their outer ends secured to the cylindrical wall 11a of the grain storage bin 11 and their inner ends secured to a bearing support 42.

Each of the arms 40 is provided with a plurality of apertures 43 which form a multitude of air jets to be introduced into the volume of grain within the grain storage bin for drying the same. By rotating the distributor 12 while injecting drying air therethrough, the entire volume of grain is uniformly and thoroughly dried to maintain the grain in excellent condition for long periods of time.

In accordance with another aspect of this invention, a control circuit 50 is provided to automatically energize the various components of the grain storage and drying apparatus. The control 50 includes a moisture-sensing element 51 positioned in the conduit 16 near the outlet 14 and connected to a control panel 52 over a line 53. The moisture-sensor 51 produces a control signal upon sensing a moisture content above a predetermined minimum level to energize suitable control means within the control panel 52. The control means in the control panel then energizes the refrigerating system 15 within the conduit 18 over a line 54. The motor 33 is also energized over a line 56 and, therefore, automatic control is obtained.

A temperature-sensing element 57 may be provided within the duct means 23 to sense the temperature of the air delivered to the inlet 24. If this temperature is not sufficient, the sensor 57 may energize a control circuit within the control panel 52 which, in turn, energizes the auxiliary heater 36 over a line 58. While the auxiliary heater 36 is here illustrated as being energized by a temperature-sensing device, it will be understood that it can be energized either manually or by sensing the relative moisture content within the duct 16. This may be accomplished by providing a second moisture sensor at the outlet 14 to sense a different level of moisture and to energize the auxiliary heater.

A pair of temperature probes 60 and 61 are secured to the cylindrical wall 11a of the grain storage bin 11 and have connecting means 62 and 63, respectively, coupled to the control panel 52 by a pair of lines 64 and 66. The temperature-sensing probes 60 and 61 may be positioned in any strategic location within the grain storage bin, to be free of interference with the rotating arms 40 of the distributor 12. The sensing probes 60 and 61 detect hot spots which may occur as a result of bacterial growth. Should such hot spots occur, signals are delivered over lines 64 and 66 to energize the air conditioning system 15 within the duct 18 to introduce heated dry air into the grain storage bin.

The air conditioning system 18 may be of any suitable size depending on the requirements for drying the grain within the storage bin. For example, should it be desired to dry the grain rapidly a larger air conditioning unit would be required. Similarly, the size of the bin also determines the size of the air conditioning unit required. One example of the size of the air conditioning unit would be a 3 ton conventional air conditioner. Of course, the size of the unit may be less or greater than the 3 ton unit mentioned depending upon the requirements as set forth above.

Another important feature of this invention contemplates providing a selectively portable unit 15 which may be moved to and connected to any one of a plurality of storage bins 11. The compact unit 15 is releasably connected to the ducts 16 and 23 by suitable coupling means 70 and 72, respectively. Also, the filter unit 17 can be disconnected from the cart 15 by a coupling unit 73. In similar fashion the auxiliary heating unit 36 can be removed from the cart by a coupling unit 74. The auxiliary heater and filter than can be placed on the cart to form a more compact package for transporting from place to place.

A pipe portion 77 between the filter 17 and the coupling 73 includes a butterfly damper valve 78 drivingly coupled to a drive motor 79 by means of a belt or chain 80. A second butterfly damper 81 is mounted within an extension portion 82 of the pipe portion 77 and is drivingly coupled to the butterfly damper 78 by means of a belt or chain 83. When the butterfly dampers are in the position shown in FIG. 1, air flow through the duct 16 passes through the duct portion 77 and directly into the evaporator 19. However, operation of the motor 79 will rotate the butterfly dampers 78 and 81 to close off the return flow path from the duct 16 and open up the damper 81 to draw in outside air. A temperature sensing element 85 is mounted within the evaporator housing 19 and is coupled by means of a control line 86 to the control unit 52. Therefore, should the temperature of the evaporator 19 raise above a predetermined temperature the sensing element 85 will trigger control means 52 to energize the drive motor 79. This action will cause the dampers to operate as mentioned and draw in cooling outside air through the duct portion 82. The back pressure built up at the downstream side of dampers 78 is then vented to atmosphere through a plurality of spring loaded louvers 87. This arrangement, therefore, enables means for maintaining the compressor pressure within predetermined limits as specified by the inherent design of the air conditioning unit by cooling the evaporator with outside air.

What has been described is a simple and efficient grain storage and drying apparatus which is substantially improved over existing devices in that it reduces the cost of drying and storing such grain as well as provides a system which is highly efficient and saves energy as a result thereof. While only a single specific embodiment of the present invention has been illustrated herein, it will be understood that variations and modifications may be effected without departing from the spirit and scope of the novel concepts set forth in the following claims.

The invention is claimed as follows:

1. Apparatus for drying and aerating grain comprising: a grain storage bin having top and bottom walls and side wall means, a refrigeration system including an evaporator, compressor and condensor, a first conduit means positioned about said refrigeration system for providing an air flow path from an inlet adjacent said evaporator, over said compressor and through an outlet adjacent said condensor, second conduit means between said top wall of said grain storage bin and said inlet of said first conduit means for providing an air flow path for moisture-laden air removed from said grain storage bin to be directed through said evaporator where moisture is condensed and removed to dry the air, and third conduit means between said outlet of said first conduit means and said bottom wall of said grain storage bin for directing dry air, which has been heated while passing through said first conduit means, into said grain storage bin for drying and aerating the grain stored therein, and said second conduit means including air flow control means for venting said moisture-laden air into the atmosphere prior to entering said inlet and for drawing outside air into said evaporator.

2. Apparatus for drying and aerating grain as set forth in claim 1 wherein said grain storage bin includes, air flow distribution means having an inlet coupled to said third conduit means through said bottom wall, and a plurality of outlets within said grain storage bin to provide a multitude of drying air jets for uniformly drying grain within said grain storage bin.

3. Apparatus for drying and aerating grain as set forth in claim 2 wherein said air flow distribution means includes a hollow vertical column having an open bottom end rotatably mounted with said bottom wall and in air flow communication with said third conduit means, said hollow vertical column having a top end thereof closed, a plurality of radially outwardly directed hollow arms secured to said hollow vertical column for receiving air flow therefrom, each of said arms having a plurality of apertures for discharging said multitude of drying air jets.

4. Apparatus for drying and aerating grain as set forth in claim 3 further including drive means for rotating said hollow vertical column and moving said arms laterally through grain stored within said grain storage bin.

5. Apparatus for drying and aerating grain as set forth in claim 4 wherein said drive means includes a motor having an output shaft, first gear means secured to said output shaft, second gear means secured to the closed upper end of said hollow column and coupled to said first gear means, and motor control means for energizing said motor and rotating said hollow vertical column during a drying and aerating operation.

6. Apparatus for drying and aerating grain as set forth in claim 1 further including auxiliary heating means positioned in fluid communication with said third conduit means for supplying additional heat to the air flow directed to said inlet of said grain storage bin.

7. Apparatus for drying and aerating grain as set forth in claim 1 further including filter means mounted in fluid communication with second conduit means for filtering air particles therefrom prior to the air reaching said inlet of said first conduit means.

8. Apparatus for drying and aerating grain as set forth in claim 1 further including drain means associated with said evaporator of said refrigeration system for removing condensed moisture therefrom.

9. Apparatus for drying and aerating grain as set forth in claim 1 further including control means, moisture-sensing means for sensing the moisture content of the air at the outlet of said top wall and coupled to said control means, and circuit means associated with said control means and coupled to said refrigeration system for energizing the same in response to said moisture-sensing means sensing a moisture content above a predetermined minimum level for supplying drying air to said grain storage bin.

10. Apparatus for drying and aerating grain as set forth in claim 9 further including heat sensing means positioned in heat sensing relation at strategic points within said grain storage bin, said heat-sensing means being coupled to said control means and responsive to sensing pockets of heat caused in the grain within said grain storage bin, said control means thereby energizing said refrigeration system for delivering dry and aerating air to said grain storage bin.

11. Apparatus for drying and aerating grain as set forth in claim 1 further including temperature sensing means for sensing the temperature of said evaporator, and circuit means responsive to said temperature sensing means to control the operation of said flow control means when said evaporator reaches a predetermined temperature.

12. A grain drying system comprising a grain storage bin for housing grain to be dried and having an air inlet and an air outlet, a mobile support selectively movable to a position adjacent said bin, first conduit means mounted on and carried by said mobile support, a refrigeration system including an evaporator, a compressor a condensor enclosed within said first conduit means and carried by said mobile support, said first conduit means including an air flow path having an inlet adjacent to and upstream from said evaporator, an intermediate portion extending around said compressor and an outlet adjacent to and downstream from said condensor, said first conduit means directing air into contact with said evaporator to be cooled and dried thereby and subsequently into contact with the compressor and the evaporator to be heated thereby as the air flows through said first conduit means, second duct means detachably connectable between said outlet of the first duct means and the inlet of the bin, and third duct means detachably connectable between said inlet of the first duct means and the bin outlet.

13. A unit as defined in claim 12, which includes quick-disconnect coupling means at opposite ends of said first duct means for facilitating connection to said bin air outlet and inlet.

* * * * *